(12) United States Patent  
Tachibana

(10) Patent No.: US 6,390,249 B2
(45) Date of Patent: May 21, 2002

(54) CONTROL METHOD FOR A ROLLER WITH A BUILT-IN MOTOR

(75) Inventor: Toshiyuki Tachibana, Himeji (JP)

(73) Assignee: Itoh Electric Co., Ltd., Hyogo (JP)

( * ) Notice: Subject to any disclaimer, the term of this patent is extended or adjusted under 35 U.S.C. 154(b) by 0 days.

(21) Appl. No.: 09/905,764

(22) Filed: Jul. 13, 2001

(30) Foreign Application Priority Data

Jul. 14, 2000 (JP) ........................................ 2000-214496

(51) Int. Cl.$^7$ ................................................ B60T 13/04
(52) U.S. Cl. ........................................ 188/171; 188/161
(58) Field of Search ................................ 188/161, 162, 188/164, 171; 192/90, 103 R

(56) References Cited

U.S. PATENT DOCUMENTS

| | | | | |
|---|---|---|---|---|
| 4,049,089 A | * | 9/1977 | Rundle | 188/171 |
| 4,515,251 A | * | 5/1985 | Wruk | 188/171 |
| 5,172,798 A | * | 12/1992 | Mabee | 192/18 B |
| 5,988,327 A | * | 11/1999 | Snyder | 188/171 |
| 6,161,659 A | * | 12/2000 | Maurice | 188/171 |
| 6,237,730 B1 | * | 5/2001 | Dropmann et al. | 188/171 |
| 6,269,917 B1 | * | 8/2001 | Harting et al. | 188/161 |
| 6,293,372 B1 | * | 9/2001 | Lorenz et al. | 188/73.35 |
| 6,321,883 B1 | * | 11/2001 | Pfann et al. | 188/161 |

* cited by examiner

*Primary Examiner*—Christopher P. Schwartz
*Assistant Examiner*—Devon Kramer
(74) *Attorney, Agent, or Firm*—Koda & Androlia

(57) ABSTRACT

In a roller with a built-in motor, which is powered by a brushless motor and stopped by an electromagnetic brake, when an electric current is supplied to the brushless motor, an electric current is supplied at a certain voltage to the electromagnetic coil to release the electromagnetic brake. The rpm of the brushless motor is detected; and when it reaches a certain predetermined level, the supply of the electric current to the electromagnetic coil is turned off and on in a short period of time, thus maintaining the released condition of the electromagnetic brake. By turning off and on the supply of the electric current to the electromagnetic coil, the average voltage can be maintained low, and the heat generation can be reduced.

2 Claims, 2 Drawing Sheets

CONTROL METHOD FOR A ROLLER WITH A BUILT-IN MOTOR

BACKGROUND OF THE INVENTION

1. Field of the Invention

Figures 1A, 1B:
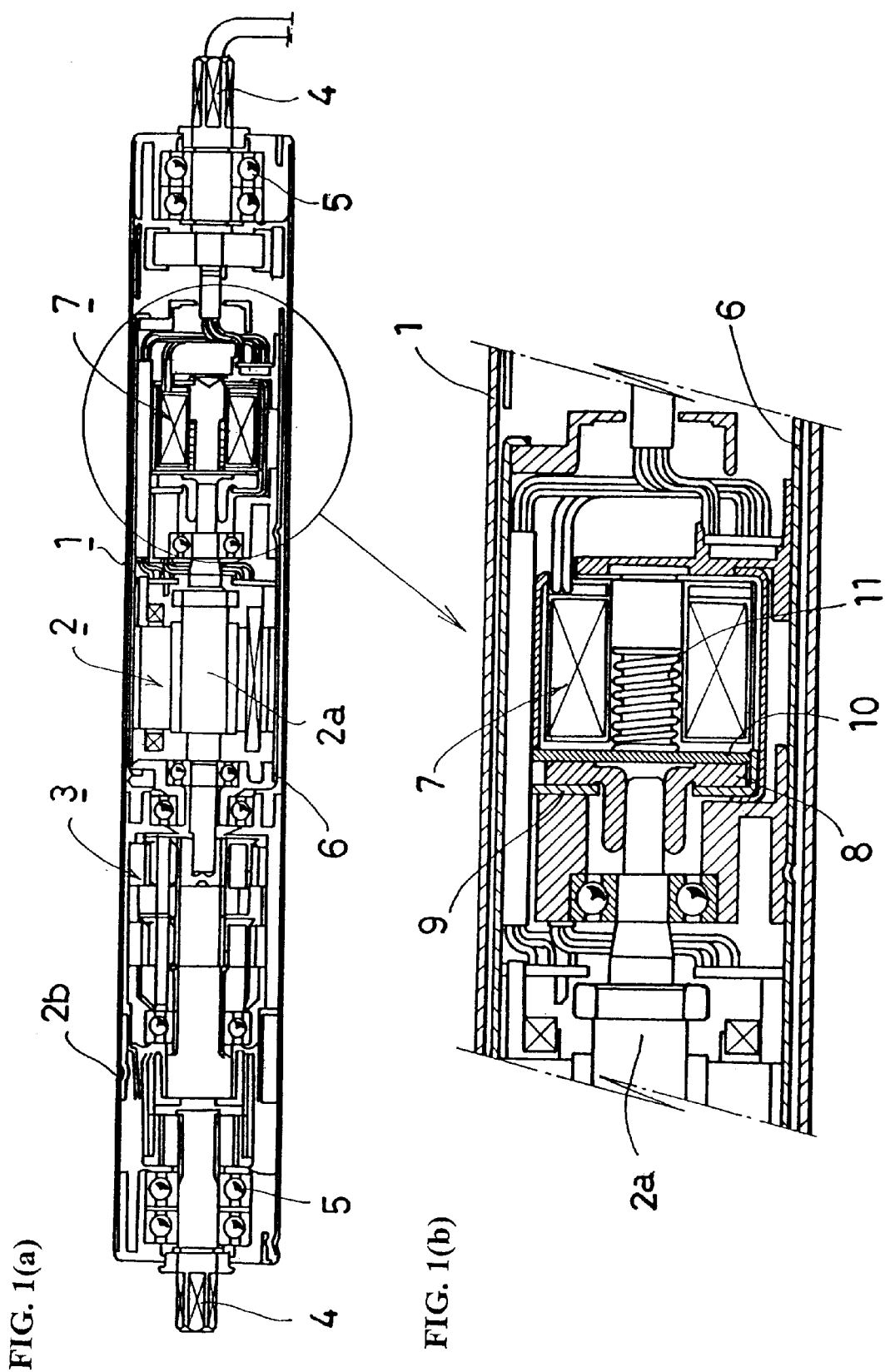

The present invention relates to a control method for a roller with a built-in motor equipped with an electromagnetic brake used mainly for driving a belt conveyor.

2. Prior Art

In a roller with a built-in motor for a conveyor, an electric brake is normally used to stop the rotation of the roller. In this stopping method, even when the roller rotation stops, the conveyor can still keep on moving because of an external force. In another method, an electromagnetic valve is used to solely stop the rotation of the roller mechanically. However, this method has problems. For instance, the brake pad can easily wear out. In order to avoid this problem, the inventors of the present patent application proposed a method for reducing the friction in Japanese Patent Application No. 339967/1999. In this method, the friction of the friction part is reduced by way of activating an electromagnetic brake after the motor rotation decreases.

Development of high-performance magnets in recent years provides compact and high-torque motors and further small and high-powered rollers with built-in motors. When a small and high-powered roller with a built-in motor is equipped with an electromagnetic brake, there is a problem of insufficient braking force. For example, when stopping a heavily loaded conveyor in an inclined line, it is difficult to maintain the stopped condition. So as to solve this problem, it is necessary to build in an electromagnetic brake having a large stopping power. Such an electromagnetic brake can be achieved by employing a strong brake spring that presses the friction part. To release the brake, however, a high-voltage electric current is needed for the electromagnetic coil to increase the suction force of the electromagnetic coil. This causes another problem. A highly heated electromagnetic coil is required when the brake is released.

SUMMARY OF THE INVENTION

Accordingly, the object of the present invention is to provide a control method for a roller with a built-in motor by way of using a strong brake spring and an electromagnetic coil with minimum heat generation, thereby accomplishing a roller with a built-in motor equipped with an electromagnetic brake that has a strong stopping power.

More specifically, the roller with a built-in motor of the present invention is equipped with an electromagnetic brake, wherein a brake spring presses a friction part to activate the brake in a stopped condition, a run signal causes an electromagnetic coil to be energized, and the suction force of the electromagnetic coil cancels the pressure on the friction part in resistance to the resilience of the brake spring; and in order to accomplish the above object, in the present invention, when the motor rotation (rpm) reaches a predetermined value, the electromagnetic coil, which has been energized at a constant voltage by the run signal, is turned off and on repeatedly in a short period of time, thus lowering the average voltage of the electromagnetic coil and reducing the heat generation in the electromagnetic coil.

BRIEF DESCRIPTIONS OF THE DRAWINGS

FIG. 1 (*a*) is a longitudinal sectional view of a roller with a built-in motor according to one embodiment of the present invention, and FIG. 1 (*b*) is an enlarged view of the portion encircled in FIG. 1(*a*);

FIGS. 2(*a*) and (*b*) are longitudinal sectional views of an electromagnetic brake used in the roller with a built-in motor of the present invention, illustrating relative positions of the electromagnetic coil and the electromagnetic plate; and FIGS. 3(*a*) through 3(*c*) are timing charts of the working condition of the brushless motor and the timing for controlling electricity supply to the electromagnetic coil.

DETAILED DESCRIPTION OF THE INVENTION

Embodiments of the present invention will be described with reference to the accompanying drawings.

FIGS. 1(*a*) and 1(*b*) show longitudinal sections of an example of a roller with a built-in motor. This roller has a brushless motor 2 built inside the external tube 1. The rotation of the rotor shaft 2*a* of the brushless motor 2 is transmitted to the external tube 1 from an output part 2*b* via a reduction gear 3. The roller is attached to the conveyor (not shown) via fixed shafts 4. The external tube 1, which is linked to the rotor shaft 2*a*, rotates around the fixed shafts 4. Between the external tube 1 and the fixed shafts 4, bearings 5 are provided to smooth the rotation. Inside the external tube I is installed a fixed tube 6, which is provided with an electromagnetic brake 7 for physically stopping the rotation of the rotor shaft 2*a*.

As seen from FIG. 1(*b*), an electromagnetic brake 7 is provided inside the roller. The electromagnetic brake 7 is equipped with an inner disk 8, which is a friction part, at the tip of the rotor shaft 2*a*. The inner disk 8 is interposed between an outer disk 9, which is a fixed part, and an electromagnetic plate 10, which is freely movable in the axial direction. The electromagnetic plate 10 is pressed against the inner disk 8, the friction part, by a brake spring 11. In other words, when the electromagnetic plate 10 is pressed against the inner disk 8, the inner disk 8 is pressed between the outer disk 9 and the electromagnetic plate 10, maintaining the braked condition.

The axially movable electromagnetic plate 10 is attracted to an electromagnetic coil 12 (see FIG. 2(*a*)) of the electromagnetic brake 7 so as to release the brake. When the electromagnetic coil 12 is not energized, the electromagnetic plate 10 is pressed against the inner disk 8 by the resilience of the spring 11, maintaining the braked condition. When the electromagnetic coil 12 is energized and generates a magnetic attraction, then the electromagnetic plate 10, which has been pressed against the inner disk 8, is attracted to the electromagnetic coil 12 in resistance to the resilience of the spring 11, and the braked condition is released.

FIGS. 3(*a*) through 3(*c*) show the working condition of the brushless motor and the timing for controlling the electric load for the electromagnetic coil 12.

More specifically, FIG. 3(*a*) shows the energizing condition for the brushless motor 2. FIG. 3(*b*) shows the rotation pulse of the brushless motor that is detected by the motor driver. FIG. 3(*c*) shows the control condition for the input to the electromagnetic coil. When the electricity is not supplied to the brushless motor 2, the electromagnetic coil 12 is not energized; and the electromagnetic brake works on the roller, and the motor pulse is stopped.

When the motor is turned on at timing A, the electromagnetic coil is energized, releasing the electromagnetic brake. Then, the brushless motor starts rotating and reaches a certain predetermined high rotation (rpm) at timing B.

Between timing A and timing B, a constant voltage is continuously supplied to the electromagnetic coil 12. When the rotation (rpm) of the brushless motor reaches a certain predetermined level, the electromagnetic coil 12 is turned off and on repeatedly in a short period of time, maintaining the condition in which the electromagnetic brake is released.

To stop the motor rotation, the motor is turned off at timing C. This decelerates the rotation of the motor. At timing D, when the rotation (rpm) of the motor 2 is reduced to a certain predetermined level, the electromagnetic coil is turned off, which activates the electromagnetic brake, thus stopping the motor completely (timing E). As a result, the roller maintains the condition in which the electromagnetic brake is on.

As seen from the above, according to the control method of the present invention, when the motor is turned on, an electric current of a certain predetermined voltage is applied to the electromagnetic coil; and when the motor rotation (rpm) reaches a certain predetermined level, the electric current to the electromagnetic coil is turned off and on repeatedly in a short period of time. Accordingly, it is possible to lower the average voltage of the electric current to the electromagnetic coil in a continuous operation of the brushless motor and to reduce heat generation of the electromagnetic coil. In other words, even when a stronger brake spring 11 is used to increase the brake force, the average voltage of the electric current to the electromagnetic coil in a continuous operation is maintained below the allowable heat-generating value.

The reason that the electromagnetic brake remains released when the electric current is supplied to the electromagnetic coil in pulses thereby reducing the average voltage will be described with reference to FIGS. 2(a) and 2(b).

Figure 2A:
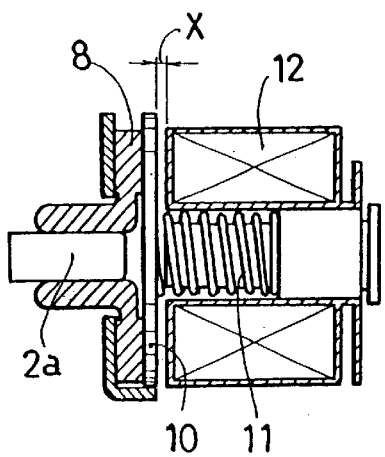
Figure 2B:
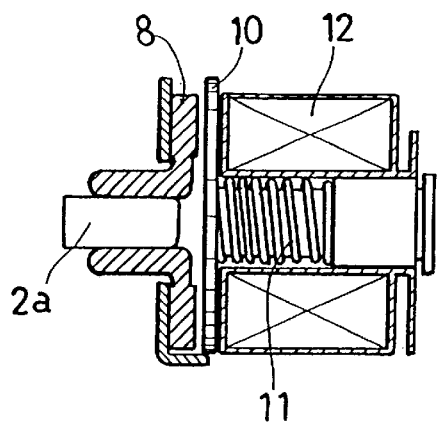

FIGS. 2(a) and 2(b) show the relative positions of the electromagnetic coil 12 and the electromagnetic plate 10. More specifically, FIG. 2(a) shows that the electric current is not supplied to the electromagnetic coil 12 and the brake is on. FIG. 2(b) shows that the electric current is supplied to the electromagnetic plate 10 and the brake is released.

In FIG. 2(a), the electromagnetic plate 10 is pushed against the inner disk 8 by the brake spring 11. In this condition, there is a clearance of X between the electromagnetic coil 12 and the magnetically attractable surface. In order to attract the electromagnetic plate 10 in resistance to the resilience of the brake spring 11, an electric current of a high voltage needs to be supplied to the electromagnetic coil to obtain huge magnetic attraction. In contrast, when the electromagnetic coil 10 is adhered to the magnetically attractable surface of the electromagnetic coil 12, there is no clearance. In this condition, it is possible to maintain adhesion that is strong enough to resist the resilience of the brake spring with excitation at a relatively low voltage.

The voltage for the electromagnetic coil 12 necessary for releasing the brake from the braking condition and the voltage for the electromagnetic coil 12 necessary for maintaining the condition in which the brake is released vary depending upon the specific designs of the relevant components. In experiments conducted by the inventors of the present application, the condition in which the brake is released (the condition in which the electromagnetic plate is attracted) was maintained at a voltage less than one third of the voltage necessary for releasing the brake from the braked condition. Accordingly, the ratio between the "ON" time and the "OFF" time of the pulses of the electric current to the electromagnetic coil can be set anywhere between 1:1 or 1:2.

Figure 3A:
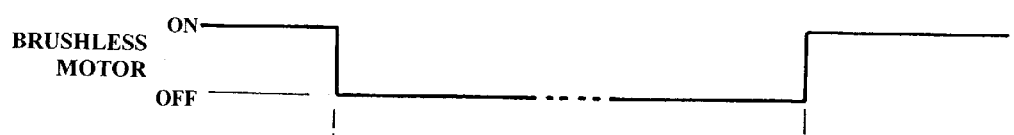
Figure 3B:
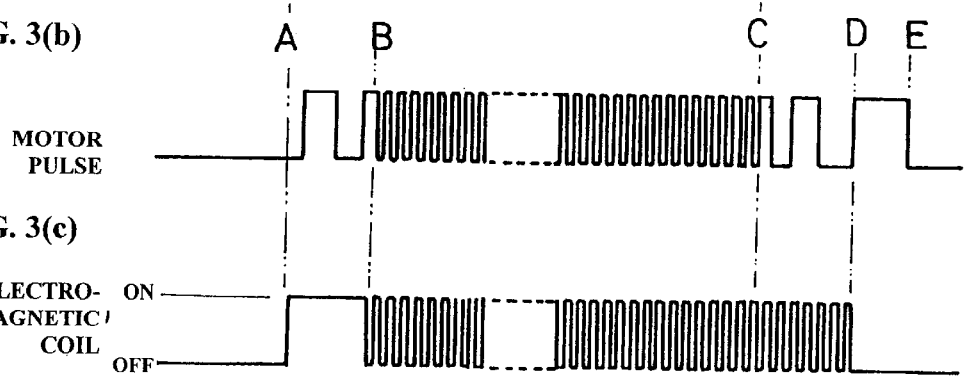
Figure 3C:

To stop the motor, in the control method shown in FIGS. 3(a) through 3(c), an electric current continues to be supplied to the electromagnetic coil even after the motor is turned off at timing C. The electric current to the electromagnetic coil stops only at timing D when the rotation (rpm) of the motor decreases below a certain predetermined level. With this method, it is possible to prevent a large frictional force applied to the inner disk 8 and to prolong the life of the roller with a built-in motor by way of minimizing the wear of the inner disk, which is a friction part.

According to the control method for a roller with a built-in motor of the present invention, a powerful brake spring is used to obtain a maximum braking force in a roller that is equipped with an electromagnetic brake. Thus, it is possible to keep the average voltage of the electric current supplied to the electromagnetic brake for releasing the brake and to reduce heat generation in the electromagnetic coil. When this method is applied to a roller equipped with a compact and powerful motor and such a roller is used in a conveyor that needs to be stopped in an inclined condition while loaded, the conveyor can maintain a stopped condition safely.

In addition, according to the present invention, the brake parts are not activated in a heavily loaded high revolution per minute condition. Instead, the brake is applied after the rotation of the roller decelerates to a certain predetermined level. Accordingly, the wear of the brake can be effectively prevented.

What is claim is:

1. A control method for a roller with a built-in motor equipped with an electromagnetic brake, in which, in a stopped condition, a brake spring presses a friction part so as to activate the electromagnetic brake, a run signal causes an electromagnetic coil to be energized, and a suction force of the electromagnetic coil cancels a pressure on the friction part in resistance to a resilience of a brake spring, wherein
when the motor reaches a predetermined rotation (rpm), the electromagnetic coil, which has been energized at a constant voltage by the run signal, is turned off and on repeatedly in a short period of time.

2. The control method according to claim 1, wherein after a stop signal is received, the electromagnetic coil continues to be turned off and on until the motor decelerates to a predetermined rotation (rpm), and stops being energized when the rotation (rpm) of the motor reaches a desired rotation (rpm), thereby activating the electromagnetic brake.

* * * * *